Patented June 16, 1942

2,286,953

UNITED STATES PATENT OFFICE 2,286,953

METHOD FOR MAKING THYMOL

Marion Scott Carpenter, Nutley, N. J., assignor to Burton T. Bush, Inc., New York, N. Y., a corporation of New Jersey No Drawing. Application August 2, 1940,
Serial No. 350,116

11 Claims. (Cl. 260—626)

The present invention relates to the preparation of alkylated phenols. More particularly, it relates to the preparation of thymol by the Friedel-Crafts reaction.

There are several known methods for the preparation of thymol from cresol. Some, e. g. those employed in U. S. 1,886,311 and U. S. 1,902,904, are conducted at comparatively high temperatures and pressures. The commercial disadvantages of processes dependent on high temperatures or pressures are well known.

Prior art processes lead to mixtures of isomers of thymol, in which mixtures the isolation of the desired thymol from its undesirable isomers such as e. g. 1-hydroxy-3-methyl-5-isopropyl benzene is difficult and commercially impracticable. In some cases, such isolation is even impossible. In U. S. 2,064,885 I disclosed the use of ethylene di-chloride and certain other inert liquids as solvents for these Friedel-Crafts reactions. The employment of low temperature was also taught in this patent.

My present invention represents an advance in the art over U. S. 2,064,885. Hitherto, as far as I am aware, it has been necessary to use pure or substantially pure m-cresol in the preparation of thymol. By my present invention, mixtures containing m-cresol can be employed to yield isolatable amounts of thymol in commercial yields. Commercially available 80:20 m- p-cresol, i. e. a mixture of m- and p-cresol containing 80 parts of m-cresol and 20 parts p-cresol by weight or even 60:40 m- p-cresol may be used to make thymol on a practical scale by the present process. The utilization on a commercial scale of a relatively low priced, easily available mixture of m- and p-cresol, instead of the more expensive pure m-cresol obviously indicates a practical advance in the art.

A further advantage of my present process is that substantially higher yields of thymol can be obtained thereby. Other objects and advantages of the present invention will be apparent to those skilled in the art from this specification.

I have found that in the process of making thymol by reacting m-cresol (or a mixture of cresols containing m-cresol in an amount not substantially less than 60% of the total) with certain isopropylating agents at temperatures between —20° C. to 0° C. and in the presence of certain inert liquids and a Friedel-Crafts reaction catalyst, the aforementioned advantageous results are obtained if the inert liquid is used in sufficiently small amounts so as to constitute a "practical minimum." By this latter term is meant enough inert liquid to just dissolve the reaction mixture and yield a mass capable of being agitated during and throughout the process with the usual stirring equipment. I have determined that this "practical minimum" is 50–100 grams of inert liquid per mol of cresol or total cresols treated.

These results were entirely unexpected and unobvious. It could not have been foreseen that decreasing the inert liquid concentration would cause an increase in the amount of thymol obtained. In fact a chemist might reasonably expect that the yields of thymol could be increased by the use of more inert liquid. It appears therefore that the decreased inert liquid concentration exerts in some manner a directive influence on the reaction, favoring the formation of thymol as compared with that of isomers thereof. This phenomenon is also shown in the case where a mixture of m- and p-cresol is isopropylated by the present process.

This invention is applicable to m-cresol and mixtures containing m-cresol. Although it is operable with such mixtures in which the m-cresol is less than 60% of the mixture, I prefer to use mixtures containing the order of 75% or more m-cresol.

As isopropylating agents, isopropyl halides, e. g., isopropyl chloride may be used. Also, substances such as diisopropyl m-cresol may be employed if they are capable of splitting off an isopropyl radical under the reaction conditions. When di-isopropyl m-cresol is used, one mol thereof is considered the equivalent of 1 mol of isopropyl chloride. The term isopropylating agent when used in the specification and claims hereof is used to denote isopropyl halides and substances which are capable of splitting off an isopropyl radical under the reaction conditions. The catalysts suitable for this invention are the usual Friedel-Crafts reaction catalysts, aluminum chloride being a preferred example.

Of the inert liquids applicable to my process, ethylene dichloride is preferred. Tetrachlorethane and carbon bisulfide may be used also as they are inert under the reaction conditions.

The general method of procedure is to suspend more than one mol equivalent of Friedel-Crafts reaction catalyst in 50–100 grams of a suitable inert solvent, then add about 1 mol of the selected cresol or cresols and somewhat more than 1 mol of the selected isopropylating agent either together or successively. The reaction is conducted at —20° C. to 0° C. At the completion of the reaction, the product is decomposed with ice in the customary manner, the solution washed free of acid and the solvent removed by distillation. The remaining product may be worked up in various ways: by direct distillation, by crystallization where feasible or by solution in caustic soda followed by extraction with naphtha and reprecipitation of the alkaline solution.

The following examples serve to illustrate the scope of the present invention, indicating the results obtainable thereby. These examples are not intended to limit the scope of the invention, however.

EXAMPLE 1.—*Prior art*

200 grams of aluminum chloride are suspended in 450 grams ethylene dichloride and a solution of 108 grams of m-cresol in 100 grams ethylene dichloride are added, the temperature being kept at $-10°$ to $0°$ C. 87 grams of isopropyl chloride are added, the temperature being maintained below $-10°$ C. When the reaction is completed, usually after 4 hours, the clear solution is decomposed in ice and worked up in the usual manner.

There is thus obtained 73 grams of thymol having a melting point of 50.5° C. This represents a yield of 67.5% of the weight of m-cresol treated.

EXAMPLE 2.—*Present process*

200 grams of aluminum chloride were suspended in 50 grams of ethylene dichloride. The procedure, materials and quantities used in Example 1 were followed throughout with the exception that no further ethylene dichloride was used herein.

105 grams of thymol were obtained. This corresponds to a yield of 97.3% of the weight of m-cresol treated.

EXAMPLE 3.—*Prior art*

Using the same procedure, materials and quantities as in Example 1, with the exception that 108 grams of a mixture of 80% m-cresol and 20% p-cresol were used in place of the 108 grams of m-cresol used in Example 1, a yield of 51 grams of thymol may be obtained. Expressed otherwise, this represents a yield of 59% of the weight of the m-cresol treated.

EXAMPLE 4.—*New process*

Example 3 above was repeated except that the amount of ethylene dichloride employed was 50 grams. 73 grams of thymol, or a yield of 84.6% of the weight of m-cresol treated, were obtained.

EXAMPLE 5.—*Prior art*

Using the same procedure, materials and quantities as in Example 1, with the exception that 108 grams of a mixture of 60% m-cresol and 40% p-cresol were used in place of the 108 grams of m-cresol used in Example 1, a yield of 15 grams of thymol was obtained. This represents a yield of 23% of the weight of m-cresol treated.

EXAMPLE 6.—*New process*

Example 5 was repeated except that the amount of ethylene dichloride employed was 50 grams. A yield of thymol, corresponding to 40% of the weight of m-cresol used, was obtained.

Other modes of applying the principle of the invention may be employed instead of those illustrated, provided the process defined by any of the following appended claims or their equivalent be employed.

I claim as new:

1. In a process for making thymol by reacting m-cresol with isopropyl chloride in the presence of aluminum chloride at temperatures between $-20°$ C. and $0°$ C., the improvement which comprises conducting said reaction in the presence of 50 to 100 grams of ethylene dichloride for each 108 grams of m-cresol treated.

2. In a process for making thymol by reacting a mixture of meta and para cresol containing at least 75% m-cresol with isopropyl chloride in the presence of aluminum chloride at temperatures between $-20°$ C. and $0°$ C., the improvement which comprises conducting said reaction in the presence of 50 to 100 grams of ethylene dichloride for each 108 grams of total cresol treated.

3. In a process for making thymol by reacting m-cresol with an isopropylating agent in the presence of a Friedel-Crafts reaction catalyst at temperatures between $-20°$ C. and $0°$ C., the improvement which comprises conducting said reaction in the presence of 50 to 100 grams of a material selected from the group consisting of ethylene dichloride, tetrachlor ethane and carbon bisulfide for each 108 grams of meta cresol treated.

4. In a process for making thymol by reacting a mixture of meta and para cresol containing at least 75% m-cresol with an isopropylating agent in the presence of a Friedel-Crafts reaction catalyst at temperatures between $-20°$ C. and $0°$ C., the improvement which comprises conducting said reaction in the presence of 50 to 100 grams of a material selected from the group consisting of ethylene dichloride, tetrachlor ethane and carbon bisulfide for each 108 grams of total cresol treated.

5. In a process for making thymol by reacting a mixture of meta and para cresol containing substantially 60% of meta cresol with an isopropylating agent in the presence of a Friedel-Crafts reaction catalyst at temperatures between $-20°$ C. and $0°$ C., the improvement which comprises conducting said reaction in the presence of 50 to 100 grams of ethylene dichloride for each 108 grams of total cresol treated.

6. In a process for making thymol by reacting a mixture of meta and para cresol containing substantially 60% of meta cresol with an isopropylating agent in the presence of aluminum chloride at temperatures between $-20°$ C. and $0°$ C., the improvement which comprises conducting said reaction in the presence of 50 to 100 grams of a material selected from the group consisting of ethylene dichloride, tetrachlor ethane and carbon bisulfide for each 108 grams of total cresol treated.

7. In a process for making thymol by reacting a mixture of meta and para cresol containing substantially 60% of meta cresol with isopropyl chloride in the presence of a Friedel-Crafts reaction catalyst at temperatures between $-20°$ C. and $0°$ C., the improvement which comprises conducting said reaction in the presence of 50 to 100 grams of a material selected from the group consisting of ethylene dichloride, tetrachlor ethane and carbon bisulfide for each 108 grams of total cresol treated.

8. In a process for making thymol by reacting a mixture of meta and para cresol containing substantially 60% of meta cresol with an isopropylating agent in the presence of a Friedel-Crafts reaction catalyst at temperatures between $-20°$ C. and $0°$ C., the improvement which comprises conducting said reaction in the presence of 50 to 100 grams of a material selected from the group consisting of ethylene dichloride, tetrachlor ethane and carbon bisulfide for each 108 grams of total cresol treated.

9. In a process for making thymol by reacting meta cresol with an isopropylating agent in the presence of a Friedel-Crafts reaction catalyst at temperatures between $-20°$ C. and $0°$ C., the improvement which comprises conducting said reaction in the presence of 50 to 100 grams of ethylene dichloride for each 108 grams meta cresol treated.

10. In a process for making thymol by reacting meta cresol with an isopropylating agent in the presence of aluminum chloride at temperatures between $-20°$ C. and $0°$ C., the improvement which comprises conducting said reaction in the presence of 50 to 100 grams of a material selected from the group consisting of ethylene dichloride, tetrachlor ethane and carbon bisulfide for each 108 grams of meta cresol treated.

11. In a process for making thymol by reacting meta cresol with isopropyl chloride in the presence of a Friedel-Crafts reaction catalyst at temperatures between $-20°$ C. and $0°$ C., the improvement which comprises conducting said reaction in the presence of 50 to 100 grams of a material selected from the group consisting of ethylene dichloride, tetrachlor ethane and carbon bisulfide for each 108 grams of meta cresol treated.

MARION SCOTT CARPENTER.